Aug. 7, 1934.    A. McKENZIE    1,969,418
APPARATUS FOR QUICK FREEZING OF ARTICLES
Filed April 24, 1930    3 Sheets-Sheet 1
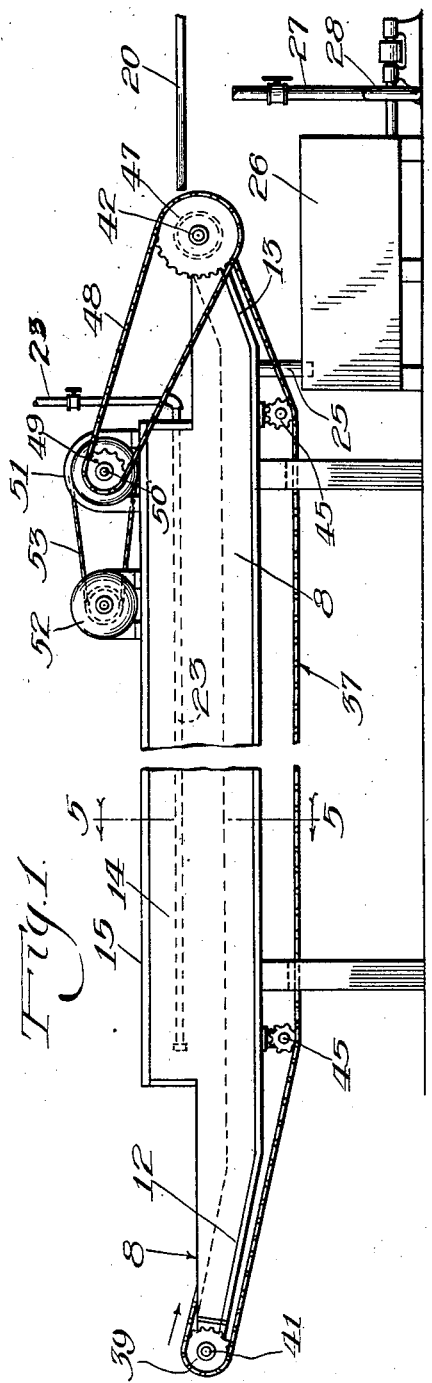
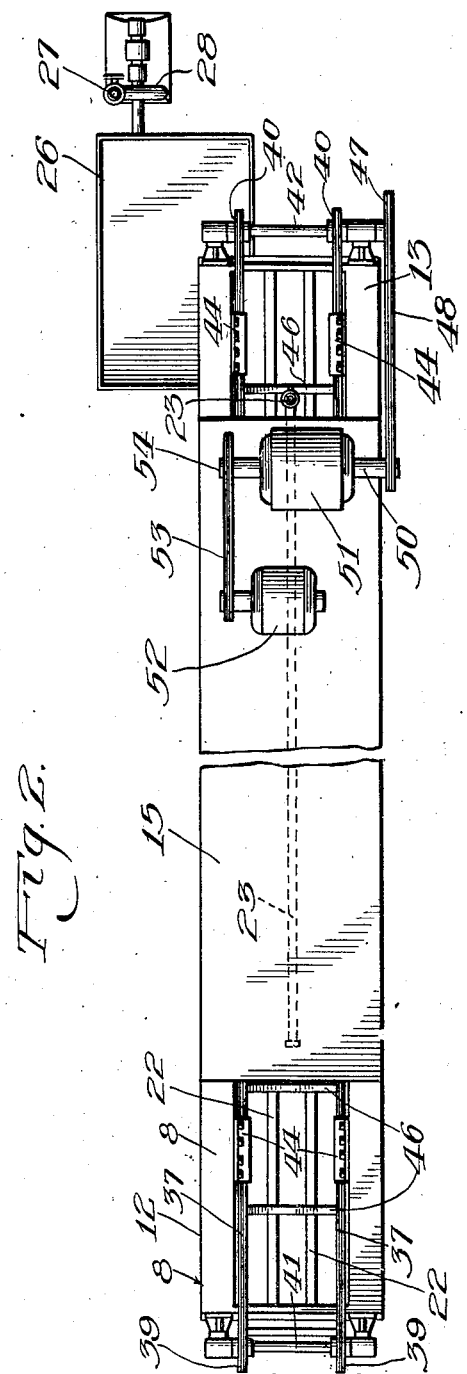
Inventor:
Allen McKenzie,
By Dyrenforth, Lee, Chritton & Wiles
Attys.

Aug. 7, 1934.  A. McKENZIE  1,969,418
APPARATUS FOR QUICK FREEZING OF ARTICLES
Filed April 24, 1930   3 Sheets-Sheet 2
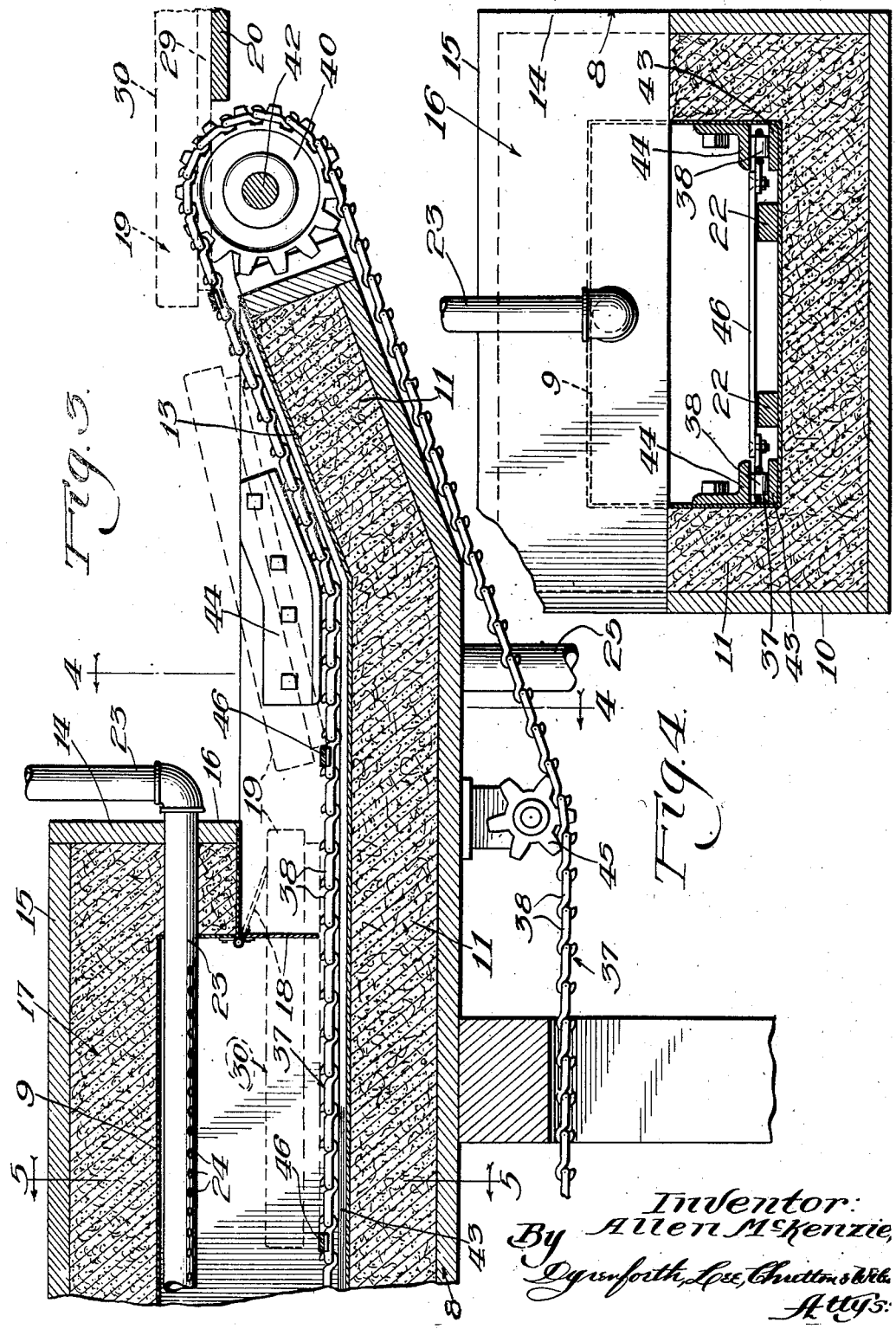
Inventor:
Allen McKenzie,
By Dyrenforth, Lee, Chritton & Wiles
Attys.

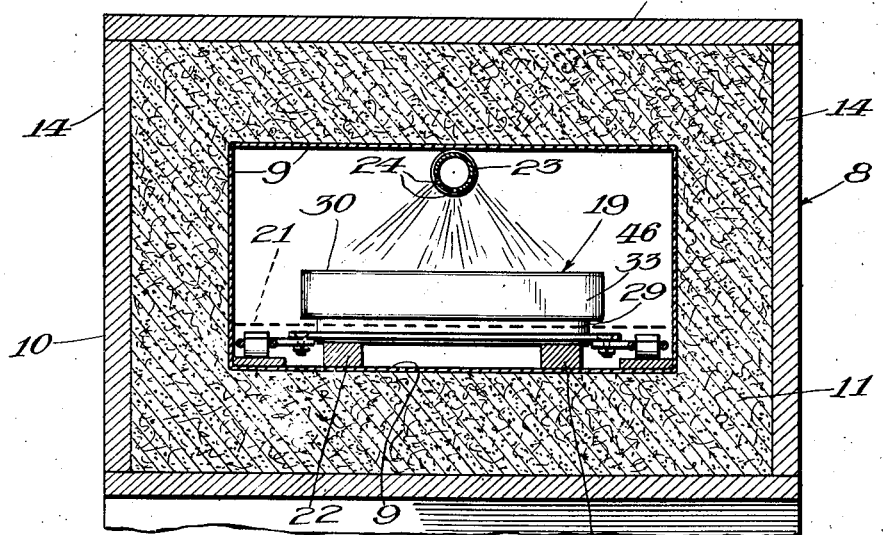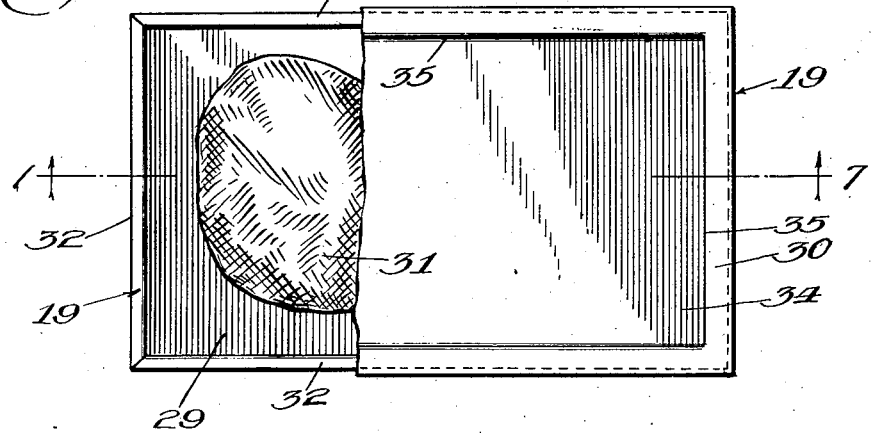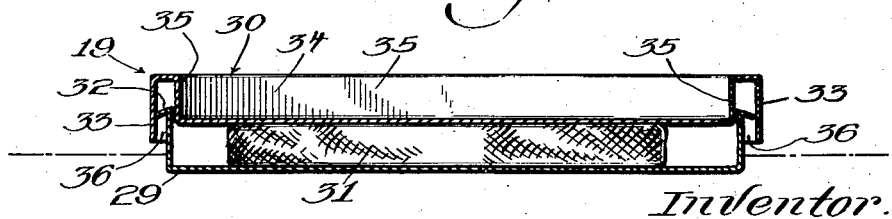

Patented Aug. 7, 1934

1,969,418

UNITED STATES PATENT OFFICE 1,969,418

APPARATUS FOR QUICK FREEZING OF ARTICLES

Allen McKenzie, Chicago, Ill., assignor to Wilson & Co., Inc., Chicago, Ill., a corporation of Delaware Application April 24, 1930, Serial No. 446,985

4 Claims. (Cl. 62—104)

My invention relates more particularly to the quick freezing of articles of food and especially so-called "cuts" of meat, such as chops, steaks, and the like.

It is highly desirable in the case of "cuts" of meat that the freezing thereof be effected as quickly as possible after the "cuts" have been severed from the carcass, to minimize drippage of the juices from the meat, thereby retaining to the maximum degree the juices contained in the "cuts" at the time of cutting. The time involved in producing the freezing of the articles is also a factor in the mater of economy of apparatus and procedure, especially as regards the capacity of the refrigerating apparatus, the greater the capability of the apparatus for quick freezing the greater the capacity thereof.

My primary object is to provide a novel method of, and apparatus for, freezing articles, especially "cuts" of meat, whereby the articles will be frozen with great rapidity and without danger of contact of the refrigerant therewith.

Another object is to provide an apparatus for the purpose stated which shall present greater capacity for freezing than apparatuses as hitherto provided.

Another object is to provide an improved form of container for the articles to be frozen to the end that access of the refrigerant to the interior thereof will be positively prevented; and other objects as will be manifest from the following description.

Referring to the accompanying drawings:

Figure 1 is a view in side elevation of an apparatus constructed in accordance with my invention and suitable for practicing my improved method, the central portion thereof being broken away.

Figure 2 is a plan view of the apparatus of Fig. 1.

Figure 3 is an enlarged view in longitudinal sectional elevation of the discharge end of the apparatus.

Figure 4 is a section taken at the line 4—4 on Fig. 3 and viewed in the direction of the arrows.

Figure 5 is a section taken at the line 5—5 on Fig. 1 and viewed in the direction of the arrows.

Figure 6 is a plan view of a cover-equipped container for the articles to be frozen, a portion of the cover being broken away; and Figure 7, a section taken at the line 7—7 on Fig. 6 and viewed in the direction of the arrows.

Referring to the particular illustrated apparatus, it comprises an elongated trough-like structure 8 shown as formed of an inner metal wall 9 and an outer wall 10, these walls being spaced apart with any suitable thermal insulating material represented at 11 interposed therebetween, the end portions of the trough inclining upwardly as represented at 12 and 13, respectively, the trough 8 being provided to receive, and present for the purpose hereinafter described, a bath of refrigerant such as, and preferably, refrigerated brine.

The sides of the trough 8 are continued upwardly, between its ends, as represented at 14 and are bridged across their upper portions by a roof structure 15 from the ends of which end walls, reaching short of the bottom of the trough 8, depend, the end wall adjacent the discharge end of the trough 8 being represented at 16. The structure thus presents, between its ends, a housing portion 17 the bottom of which is formed by a portion of the trough 8, the openings at the ends of the housing portion 17 and formed between the end walls of the housing portion and the trough, being provided with vertically swinging doors hingedly supported at their upper ends, the one of said doors which is located at the discharge end of the apparatus being represented at 18.

The containers for the articles to be frozen and represented at 19 are introduced into the trough 8 at the left-hand end of the apparatus, thence moved along the trough past the swinging door of the housing portion 17 at this end of the apparatus and into the housing portion through which they are conducted past the swinging door 18 at the discharge end of the apparatus and up the adjacent inclined end 13 of the trough to a platform 20.

In the movement of the containers through the apparatus as stated they are partially submerged in a bath of refrigerant located in the trough 8, the level of the refrigerant in the trough being preferably as indicated by the dotted line 21 (Fig. 5), the containers 19 sliding along the bottom of the trough which preferably is provided with parallel, spaced apart, skid-ways 22 upon which the containers move.

Simultaneously with the subjection of the containers 19 to the refrigerating action of the refrigerant in which they are partially submerged as stated, refrigerant, such as refrigerated brine as above stated, is discharged, preferably in the form of streams, upon the covers of the containers 19, as through a pipe 23 apertured at 24 and extending through the housing portion 17 lengthwise of the latter, this pipe being connected with any suitable source of supply of liquid refrigerant.

In the particular apparatus illustrated the bath of refrigerant in the portion 8 is supplied from the pipe 23 the trough 8 having an overflow pipe 25 through which the refrigerant displaced from the trough flows as for example into a tank 26 from which it is returned through a pipe 27 in which a pump 28 is interposed, to the refrigerating apparatus (not shown) which supplies the pipe 23 with refrigerant. Where the overflow pipe 25 is located flush with the bottom of the trough 8 as shown, the bottom of the trough will be slightly inclined downwardly toward the inlet end of the apparatus to provide for the desired depth of refrigerant bath.

Containers of the construction shown are preferably provided for the articles to be frozen. These containers, which are formed of metal, each comprise a pan 29 shown as of rectangular form, and a cover 30 therefore which rests on the upper surface of the article, or articles, to be frozen and located in the container, one such article being represented at 31 in Figs. 6 and 7. Thus both the top and bottom surfaces of the article or articles are contacted by the metal of the container and in the case of flat articles such as "cuts" of meat the opposite sides thereof are contacted throughout their areas by the highly conductive material of which the containers are formed, it being understood, of course, that if desired the "cuts" when chops or other relatively thin slices of meat, may be disposed in superposed relation in the containers in which case the bottom wall of the pan and the cover would flatwise engage with the lowermost and uppermost "cuts", respectively.

Each pan is provided about its upper marginal edge with a continuous outwardly extending, preferably downwardly inclining, flange 32, and each cover 30 is formed with an outer depending continuous flange 33 about its marginal edges, the top of the cover being depressed as represented at 34 to form an upwardly opening recess or basin, the continuous side wall 35 of which is spaced from the outer flange 33 to provide a continuous downwardly opening recess 36 at which the cover 30 extends over the upper flanged edge of the pan 29, the continuous flange 32 extending into the recess 36, the cover thus telescoping with the pan, the construction shown adapting the cover to rest flatwise upon the article or articles in the pan.

It will be understood from the foregoing that the construction of containers as described, prevents access to the interiors of the containers of the refrigerant bath or refrigerant flowing down the sides of the containers and thereby avoids contamination of the articles in the containers, by contact with the refrigerant.

The apparatus is shown as constructed to mechanically feed the containers therethrough, the illustrated means for this purpose comprising an endless chain conveyor represented generally at 37 and comprising a pair of endless link chains 38 spaced apart horizontally and supported at their opposite ends on sprockets 39 and 40, respectively, the sprockets 39 being carried by a shaft 41 journalled in the frame of the machine and the sprockets 40 by a shaft 42 also journalled in the frame of the machine. The sprockets referred to are so arranged that the upper reaches of the chains 38 which extend lengthwise through the housing portion 17 of the apparatus, are disposed closely adjacent to the side walls of the housing portion as shown in Fig. 4, these chains sliding along skid-ways 43 on the bottom of the trough 8 and beneath chain-deflecting shoes 44 located at opposite ends of the straight bottom portion of the trough 8 and holding the chains in contact with the skidways 43 throughout the length of the trough 8. The lower reaches of the chains 38 extend beneath the trough where they run over idler sprockets 45 secured to the underside of the trough.

The conveyor 37 also comprises cross bars 46 located at different points along the chains 38 and connected at their opposite ends with the latter, these cross bars extending in a plane above the skid-ways 22 and at such an elevation that they will engage with the pan-portions 29 of the containers 19 located between these cross bars, whereby in the movement of the conveyor the containers will be advanced through the apparatus.

In the arrangement shown the drive for the conveyor is effected through the shaft 42, this shaft being provided with a sprocket 47 connected by a chain 48 with a sprocket 49 secured to a shaft 50 of a speed-reducer mechanism 51 driven from an electric motor 52 through a sprocket chain 53 connecting the motor 52 with the shaft 54 of the speed reducer 51.

It will be understood from the foregoing that by employing the method and apparatus above described the articles in the containers are subjected to an intense refrigerating action which is concentrated against the articles by reason of the partial submergence of the containers in the refrigerant bath and the discharging of refrigerant upon the tops of the containers, the intensity of the refrigerating action on the tops of the containers being augmented by the provision of the recesses or basins in the covers which insure the maintaining of a body of refrigerant over practically the entire area of the cover, the refrigerant as it continues to be sprayed from the pipe 23 overflowing from these basins and down the sides of the containers to the bath in the trough, whereby, because of the displacement of refrigerant previously introduced into the apparatus, by the refrigerant subsequently introduced therein, refrigerant at the desired low temperature may be maintained in the apparatus.

While I have illustrated and described a particular apparatus by which my improved method may be practiced and have shown and described a particular form of apparatus embodying my invention, I do not wish to be understood as intending to limit it thereto as the method may be practiced by using other apparatus and the apparatus shown may be variously modified and altered without departing from the spirit of the invention.

What I claim as new, and desire to secure by Letters Patent, is:

1. A container for the purpose set forth comprising a pan provided with an outwardly extending flange adjacent its upper open end, and a cover for said pan recessed at the marginal portions of its bottom and adapted to fit at its recessed portion over the flanged portion of said pan.

2. A container for the purpose set forth comprising a pan provided with an outwardly extending flange adjacent its upper open end, and a cover for said pan recessed at the marginal portions of its bottom and adapted to fit at its recessed portion over the flanged portions of said pan and containing a recess in its upper surface for the purpose set forth.

3. A container for the purpose set forth comprising a pan provided with an outwardly extending flange adjacent its upper open end, and a cover for said pan recessed at the marginal portions of its bottom and adapted to fit at its recessed portion over the flanged portion of said pan and containing a recess in its upper surface substantially coextensive with said surface.

4. A container for the purpose set forth comprising a pan provided with an outwardly extending flange adjacent its upper, open, end, and a cover for said pan formed at the marginal portions of its bottom with horizontally spaced downwardly extending walls defining a downwardly-opening recess at which said cover fits over the flanged portions of said pan.

ALLEN McKENZIE.